July 12, 1938.  E. F. WESTON  2,123,670
ELECTRICAL MEASURING INSTRUMENT
Filed Aug. 16, 1935  2 Sheets-Sheet 1
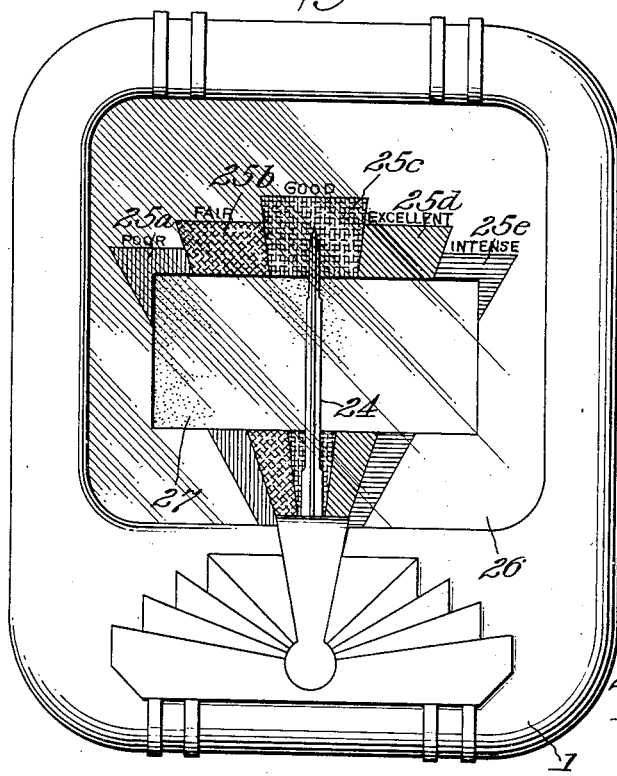
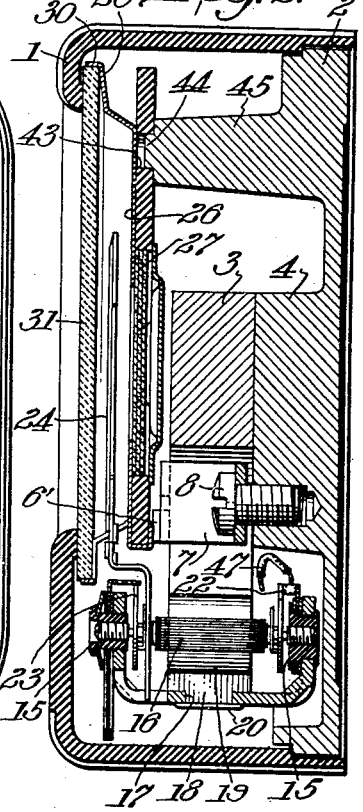
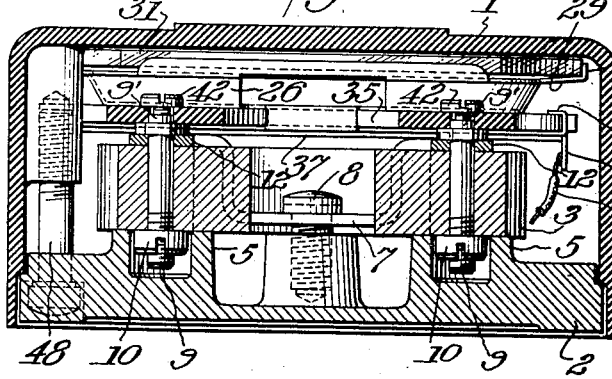
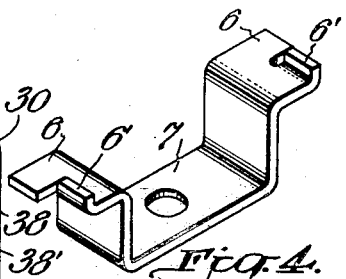
Inventor:
Edward F. Weston,
By Potter, Pierce & Scheffler,
Attorneys.

July 12, 1938.  E. F. WESTON  2,123,670
ELECTRICAL MEASURING INSTRUMENT
Filed Aug. 16, 1935  2 Sheets-Sheet 2
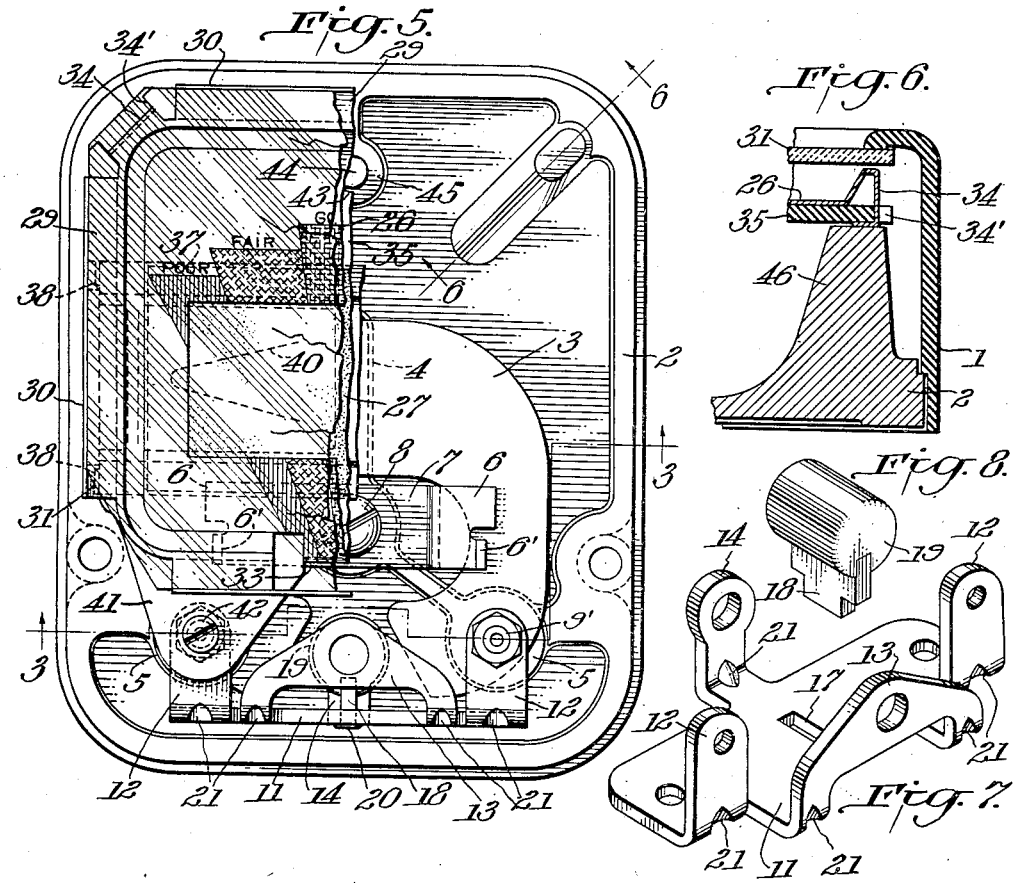
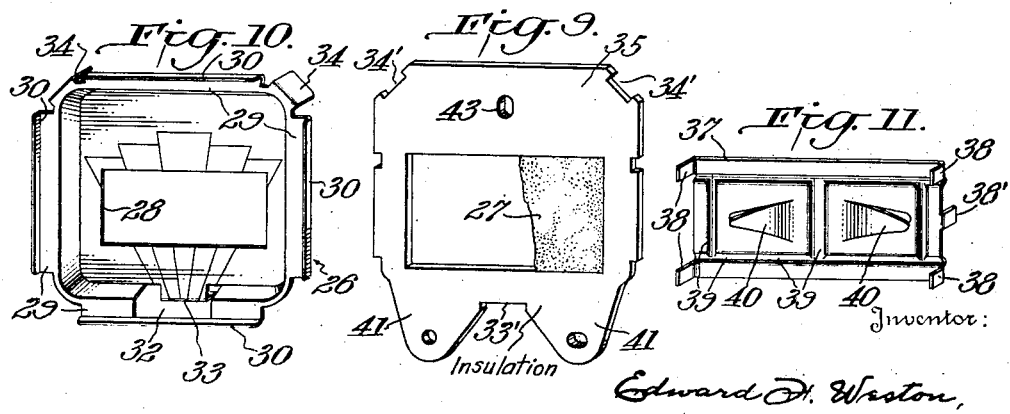
Inventor:
Edward F. Weston,
By Potter, Price & Scheffler,
Attorneys.

Patented July 12, 1938

2,123,670

UNITED STATES PATENT OFFICE 2,123,670

ELECTRICAL MEASURING INSTRUMENT

Edward F. Weston, Elizabeth, N. J., assignor to Weston Electrical Instrument Corporation, Newark, N. J., a corporation of New Jersey Application August 16, 1935, Serial No. 36,591

14 Claims. (Cl. 88—23)

This invention relates to electrical measuring instruments and particularly to light meters for the measurement or indication of light intensity.

Meters of this type include a photocell of the barrier layer type and a sensitive measuring instrument, the instrument being graduated in terms of foot candles and/or in block ranges of light values. It has been proposed to locate the photocell and the instrument side by side in a single elongated casing and, according to another design, the photocell was used as the scale plate of the instrument.

An object of this invention is to provide an electrical measuring instrument of novel physical design which may be manufactured as a relatively small unit. An object is to provide a light meter in which the photocell is positioned adjacent and parallel to the instrument scale plate. A further object is to provide a light meter in which the photocell and scale plate form a single assembly that may be readily mounted upon and electrically connected to the associated measuring instrument elements. A further object is to provide a measuring instrument in which the scale plate constitutes a guide and support for the cover glass of the instrument, the scale plate and cover glass being retained in place by a casing which encloses the instrument and is secured to the instrument base. Other objects are to provide measuring instruments having parts of novel design that simplify and facilitate the assembly of the instrument.

These and other objects and advantages of the invention will be apparent from the following specification when taken with the accompanying drawings in which:

Fig. 1 is an enlarged front elevation of one embodiment of the invention;

Fig. 2 is a longitudinal central section through the same;

Fig. 3 is a transverse section on the plane of line 3—3 of Fig. 5;

Fig. 4 is a perspective view of the clamp which secures all of the instrument parts to the base;

Fig. 5 is an elevation, with parts broken away, of the light meter as seen with the casing removed;

Fig. 6 is a fragmentary section on line 6—6 of Fig. 5;

Fig. 7 is a perspective view of the core and coil mounting bracket;

Fig. 8 is a perspective view of the core and its mount;

Fig. 9 is a perspective view of the insulating plate which carries the scale plate and cell, a portion of the cell being also shown;

Fig. 10 is a perspective view of the scale plate; and

Fig. 11 is a perspective view of the lower contact terminal of the cell.

In the drawings, the reference numeral 1 identifies the cup-shaped casing which fits over the supporting base 2 and encloses the instrument parts and the photocell. The casing may be a molded shell of metal or a synthetic resin, and may be embossed or ornamented in any desired manner. The base 2 is preferably a metal die-stamping since, as will be explained later, the base may serve as a part of the circuit of the light meter.

The circular magnet 3 rests upon bosses 4 and 5, 5 which rise above the base to support the central section and the ends, respectively, of the magnet. The bent ends 6 of wide U-clamp 7 extend over the magnet and a bolt 8 is passed through the center of the clamp to secure the magnet to the base. Shifting of the magnet is prevented by extending the bracket bolts 9 into holes in the bosses 5, the nuts 10 on the bolts having a fairly snug fit with the holes. The core and coil supporting bracket 11 is a thin metal stamping having outer ears 12 that are apertured to receive the bolts 9, and upper and lower flanges 13, 14, respectively, which have alined openings for receiving the usual jewels or bearings 15 of the moving coil 16. The central portion of the bracket has a rectangular opening 17 for receiving one edge of the brass lug or strip 18 which has its opposite edge secured in a slot 19 in the magnetic core. The strip 18 extends through the bracket and is staked over, as shown at 20, Fig. 2, to secure the core to the bracket. Attention is directed to the fact that, for clearness of illustration, Figs. 7 and 8 are not to scale. The bracket for a small instrument may be stamped from sheet brass of a thickness of, for example, about 0.05 inch, and the brass lug or core mounting 18 may be sheet brass of about 0.06 inch thick. The bends of the bracket 11 are preferably strengthened by indentations 21.

The circuit connections to the coil 16 are made, in the usual way, through the coil springs 22, 23. The lower spring is insulated from the bracket 11 and base 2, while the upper spring 23 is grounded on the bracket. The coil 16 carries a pointer 24 which moves over scale indications that, preferably, are a series of blocks 25a, 25b, etc., which correspond to ranges of light values. The several blocks are of different contrasting colors and legends may be placed adjacent the blocks to indicate the character of work for which the measured light value is appropriate. As indicated by the cross-hatching of the scale blocks in Fig. 1, the colors may be arranged in the following order, as viewed from left to right: red, orange, yellow, green, blue. The instrument has a high sensitivity for low light values where the eye strain is critical and may be read with sufficient accuracy in bright light where the question of eye strain is less critical when the light values for the several block ranges correspond to, for example, 0 to 10, 10 to 20, 20 to 50, 50 to 100 and 100 to 250 candles per square foot, respectively.

The scale blocks are painted or printed on a metallic, preferably brass, scale plate 26, Fig. 10, of novel form which serves as the outer terminal for a photo-cell 27 of rectangular shape that contacts with the edge of, and is exposed through, an opening 28 in the scale plate. The scale plate has the general form of a shallow pan or dish with upwardly flaring edge portions 29 that terminate in ribs 30 to form a frame for receiving the glass cover plate 31 of the instrument. The central front portion of the scale plate is cut away to provide an opening 32 through which the pointer 24 passes. Portions of the plate adjacent the upper corners and the opening 32 are extended as lugs 33, 34 which pass through notches 33', 34' in the edge of, and are bent under a mounting plate of insulating material 35, Fig. 9.

The photocell 27 is loosely mounted in a rectangular opening in the mounting plate, and its outer electrode surface is held in engagement with its upper terminal, i. e., the metal scale plate 26, by a lower spring terminal 37, Fig. 11, which is secured to the mounting plate 35 by the bent ends of integral lugs 38. The spring terminal has reinforcing ribs 39 and spring fingers 40 that are bent upwardly towards the photocell.

The yoke extensions 41 of the mounting plate are apertured to fit snugly over the upper extensions 9' of the bracket bolts 9, and screws 42 are threaded into the extensions 9' to secure the mounting plate 35 to the magnet and base. The opposite edge of the mounting plate has an opening 43 fitting over a pin extension 44 on a boss 45 which supports the upper edge of the plate, and the clamp 7 has upturned lugs 6', Fig. 4, which bear against and support the lower edge of the mounting plate.

The electrical circuit connections between the cell and the coil 16 are made, in part, by the engagement of the bent lugs 34 of the scale plate with bosses 46, Fig. 6, of the metallic base 2. The upper spring 23 of the coil system is also grounded upon the base 2 by the bracket 11 and the magnet 3. The circuit is completed by the lead 47 which is soldered to the lower spring 22 and to a terminal lug 38' on the spring terminal plate 37.

With this electrical connection completed, the glass cover plate 31 is placed upon the flanges 29 of the scale plate 26, and the casing 1 is slipped over the assembly and secured to the base 2 by two screws 48. The scale plate is a thin sheet or plate and the flaring edges provide a spring support for holding the glass cover against the casing.

The electrical and mechanical assembly of the instrument are exceedingly simple but the parts are all firmly retained in proper relation through the bolts 9 that secure the coil and core bracket to the magnet. The lower ends of the bolts engage the base to prevent a shifting of the magnet 3 that is secured to the base by the single clamp 7. The bolts also support and prevent shifting of the mounting plate 35 which carries the scale plate and cell assembly.

The cell 27 is closely adjacent the plane of the scale plate and is below the pointer 24 but the shadow cast upon the cell does not appreciably affect the readings, particularly when the meter is graduated, as shown, in block ranges of light values. It is to be understood that the measuring instrument is of relatively high sensitivity to provide indications of substantial magnitude from a barrier layer type of photocell of smaller size than the instrument scale plate. The light meter shown in the drawings has operated satisfactorily with an active cell area of less than one square inch.

It is to be understood that the invention is not restricted to the particular construction herein illustrated and described as many changes which may be made in the size, shape and relationship of the various parts fall within the scope of my invention as set forth in the following claims.

I claim:

1. In a light meter, an electrical measuring instrument including a casing, a magnet within said casing, a coil pivotally mounted in the field of said magnet, a thin metal scale plate within said casing a pointer carried by said coil and movable over said scale plate, a photoelectric cell within said casing, means including a conductive terminal member in contact with one face of said cell for securing said scale plate and cell to each other in parallel closely adjacent positions, and conductive means including said terminal member and said scale plate electrically connecting said cell to said coil.

2. A light meter as claimed in claim 1, wherein said scale plate is apertured, and said cell is behind the scale plate.

3. In a light meter, the combination with the casing, magnet and moving coil system of a measuring instrument, of an insulating mounting plate having an opening therein, a photocell within said opening, means supporting said mounting plate in said casing in fixed position with respect to said magnet, and terminal plate members for said cell secured to and supported by said mounting plate at the opposite sides thereof.

4. A light meter as claimed in claim 3, wherein the terminal plate member at the outer side of said mounting plate comprises the scale plate of the measuring instrument.

5. In a light meter, a cell assembly adapted to be mounted in the casing of a measuring instrument, said assembly comprising a mounting plate of insulating material having means for securing the same within the instrument casing, said plate having an opening therethrough, a photocell in said opening, an apertured terminal plate at one side of said mounting plate and having portions thereof extending over the said cell, and a terminal plate of spring material at the opposite side of said mounting plate for holding the cell against the said portions of the apertured terminal plate.

6. In a light meter, an electrical measuring instrument having a casing, a magnet, a moving coil, a bracket secured to said magnet and supporting said coil, a scale plate, a pointer carried by said coil for movement over said scale plate, a photoelectric cell of the flat disk currentgenerating type, a mounting plate of insulating material and means for securing the same in fixed position within said casing, said plate having an opening in which said cell is located, means securing said scale plate to said mounting plate, terminal members secured to said mounting plate and engaging opposite faces of said cell, and means completing an electric circuit between said terminal members and said moving coil.

7. In a light meter, the combination with an electrical measuring instrument comprising a base, a magnet means securing said magnet to said base, a moving coil carrying a pointer, a coil supporting bracket, bolts extending through said bracket and magnet to connect the same to each other, a scale plate, means including said bolts for supporting said scale plate from said base, a photoelectric cell connected across said moving coil, and means including said bolts for supporting said cell from said base.

8. A light meter as claimed in claim 7, wherein said means securing said magnet to said base includes a clamp fastened to said base and overlying said magnet, and said bolts extend into recesses in said base to prevent shifting movement of the magnet with respect to said base.

9. In a light meter, an electrical measuring instrument comprising a base, a magnet and moving coil carried by said base, a pointer mounted on said coil, a scale plate supported from said base in position to cooperate with said pointer, said scale plate having edge portions forming a seat for a cover glass, a cover glass on said seat, a photoelectric cell connected across said coil, means including said scale plate for supporting said cell, a casing for said instrument, and means securing said casing to said base.

10. A light meter as claimed in claim 9, wherein said scale plate is metallic and forms one terminal connection to said cell.

11. In a light meter, the invention as claimed in claim 9, wherein said scale plate is resilient and presses said cover glass against the inner side of said casing when said casing is secured to said base.

12. A photoelectric measuring instrument comprising a base, a magnet and means securing the same to said base, a coil and core in the field of said magnet, a bracket supporting said coil and core, an indicating system including a pointer carried by said coil and a scale plate, a photoelectric cell and means securing the same to said scale plate, and means for supporting said scale plate and cell from said magnet.

13. A measuring instrument as claimed in claim 12, wherein said scale plate is apertured, and said cell is positioned behind said scale plate to receive light through the aperture thereof.

14. In a measuring instrument, a base, a magnet and moving coil supported on said base, a scale plate, a pointer carried by said coil and movable over said scale plate, a mounting plate of insulating material, said scale plate being metallic and having lugs locking the same to the mounting plate, a photoelectric cell carried by said mounting plate, a spring terminal plate secured to said mounting plate and pressing said cell into contact with said scale plate, and means including said scale plate and terminal plate connecting said cell across said coil.

EDWARD F. WESTON.